March 6, 1928.
S. HELFGOTT
1,661,334
GEAR ROUNDING-OFF LATHE ATTACHMENT
Filed April 17, 1926    2 Sheets-Sheet 1
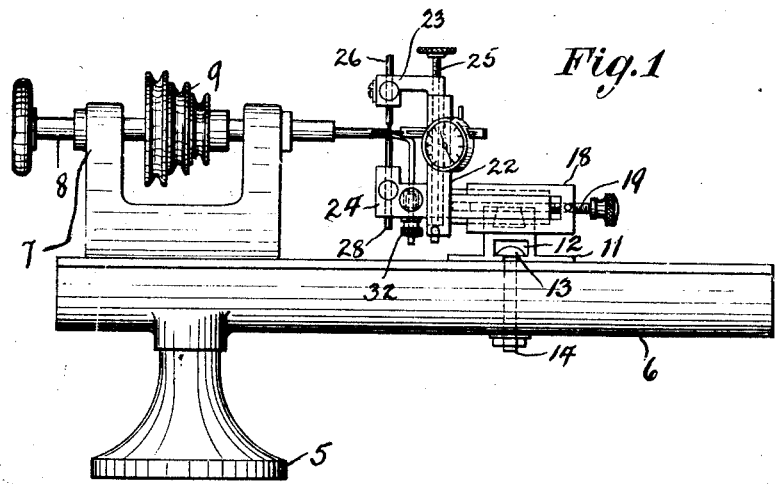
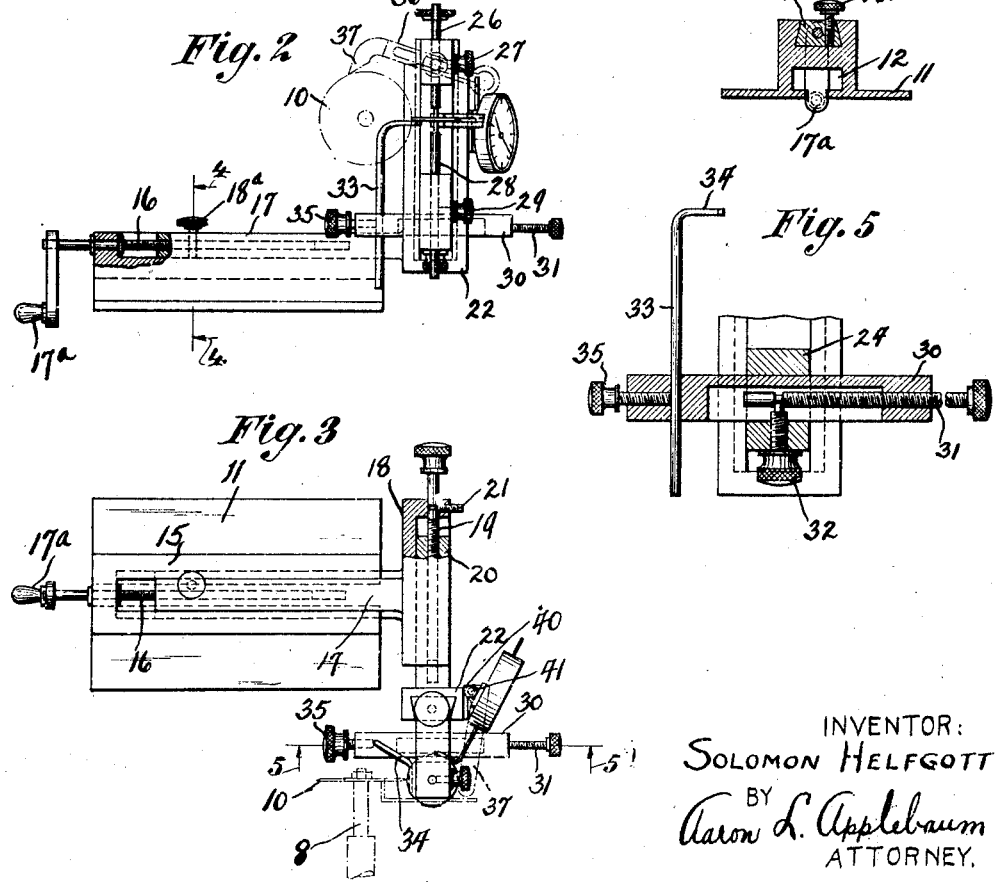
INVENTOR:
SOLOMON HELFGOTT
BY
Aaron L. Applebaum
ATTORNEY.

March 6, 1928.

S. HELFGOTT 1,661,334

GEAR ROUNDING-OFF LATHE ATTACHMENT

Filed April 17, 1926   2 Sheets-Sheet 2

INVENTOR:
SOLOMON HELFGOTT
BY
Aaron L. Applebaum
ATTORNEY.

Patented Mar. 6, 1928.

1,661,334

UNITED STATES PATENT OFFICE.

SOLOMON HELFGOTT, OF NEW YORK, N. Y.

GEAR-ROUNDING-OFF LATHE ATTACHMENT.

Application filed April 17, 1926. Serial No. 102,630.

This invention relates to lathe attachments for watchmakers and more particularly to a rounding up tool in which gears and wheels of very small diameter may be cut by the rotary cutter of the lathe with precision and accuracy.

One of the objects of my invention is to provide a lathe attachment in which the diameter of the wheel or gear being cut may be determined at all stages during the cutting operation and avoiding the necessity of constantly removing the wheel or gear to measure the same as has been done heretofore.

Another object of my invention is to construct a rounding up tool or mechanism for watchmakers' lathes including provision for adjusting the wheel or gear to be cut relatively to a rotary cutting element of the lathe and embodying means for determining the size of the said wheel or gear while it is being so cut.

An additional object of my invention is to provide a watchmakers' lathe attachment adjustable in a plurality of directions relatively to a cutting disk and having a measuring instrument constructed and arranged to function and coperate with the edge or periphery of the gear or wheel at all times during the cutting operation and to enable the operator to determine the size or diameter of the gear or wheel as it is reduced.

To enable others in the art to more fully understand the underlying features of my invention that they may embody the same in the various modifications contemplated, reference is had to the accompanying drawing showing a preferred form of the invention in which Fig. 1 is a front view of a lathe showing my attachment.

Fig. 2 is a side view of the attachment, partly in section.

Fig. 3 is a plan of the attachment, partly in section.

Fig. 4 is a sectional view taken on the line 4—4 of Fig. 2.

Fig. 5 is a sectional view taken on the line 5—5 of Fig. 3.

Figure 6:
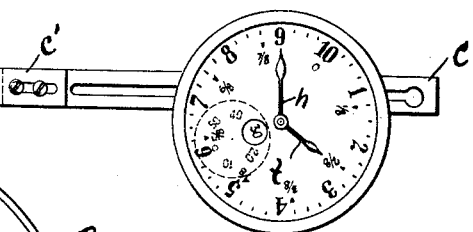
Fig. 6 is a detached view of the measuring instrument.

Referring now to the drawings wherein like reference characters designate corresponding parts throughout the several views, 5 designates the base, 6 the guide bar and 7 the shaft bearings for a conventional type of watchmakers' lathe having a lathe shaft 8 and cone pulley 9 driven by any suitable source of power such as an electric motor (not shown). On the shaft 8 there is keyed a gear tooth rounding and cutting disk 10 toward which the periphery of a gear or toothed wheel, supported on a vertical axis, is presented for the necessary rounding off or beveling of the teeth thereof.

My attachment comprises a flat plate 11 having a slot or recess 12 in the bottom to receive the head 13 of a lock bolt 14 whereby the said attachment may be securely fastened to the guide bar of the lathe. The plate 11 is provided with a block guide 15 and a feed screw 16 having a crank handle 17$^a$ at one end thereof. The screw 16 cooperates with a forwardly and rearwardly adjustable block 17 which may be moved relatively to the cutting disk 10 as shown by Figs. 2 and 3 of the drawing.

The block 17 is attached to or formed integral with a guide block 18 which is also provided with a feed screw 19. A work head block 20 within the guide block 18 is horizontally adjustable by means of the feed screw 19 and adapted to be locked by a set screw 21. The head block 20 is rigidly attached to or integral with a vertical head 22 provided with a groove in one side thereof in which is vertically adjusted the connected top and bottom post supporting arms 23, 24 by means of the vertical, threaded screw 25. The arms 23, 24 are in vertical alignment and are movable as a unit by means of the screw 25 which may be locked by a suitable set screw. The top arm 23 is provided with a vertical opening for a post or spindle 26 held by a set screw 27 and the bottom arm is also provided with a similar post or spindle 28 held by a set screw 29. A pin point recess in the bottom and top of the posts 26, 28 respectively are adapted to receive the pin retaining the gear or toothed wheel to be cut or rounded off.

It is of course understood that in this operation, the split cutting disk on the lathe shaft successively cuts or rounds off the teeth as it advances the gear or toothed wheel. Since the metal is quite thin and the diameter very small, the edge of the gear or wheel must be supported so that the downward action of the cutting disk will not bend the same or produce a side cutting action. To that end, I provide the bottom arm 24 with an adjustable block 30 which may be moved inwardly and outwardly by a feed screw 31. The feed screw is adapted to be locked by a set screw 32. A vertical pin 33 having an inwardly bent end 34 is held by a set screw 35 so that the edge of the gear or toothed wheel to be cut is provided with a support so that while the rotary movement of the wheel is not affected, the tendency to bend the wheel by the cutting element is thus overcome.

In order that the cutting disk or element of the lathe will be directly in line with the vertical axis of the gear or wheel to be cut, I provide a pointed gauge arm 36, fastened to the top arm by a screw so that the outer end 37 will be directly in front of the top post or spindle 26 and consequently in alignment with the edge of the split cutting disk. The vertical head 22 is further provided with a side bracket to which a hinged arm 37 may be connected, and as shown by the dotted lines in Fig. 3, whereby the horizontal position of the gear or toothed wheel may be determined before the cutting action is started.

It will be readily appreciated by those skilled in the art, that in rounding off the teeth of gears and wheels of very small diameters for whatever purpose such as in watch mechanism, that after the adjustments are once made and the gear or toothed wheel has been set, it becomes difficult to readily determine if the gear or wheel has been cut to the proper size. According to the old practice, it has been necessary each time to remove the gear or wheel and then measure it by a standard gauge and then replace the gear or wheel for further cutting. This slows up the operation, produces uncertainty in the work and is otherwise unsatisfactory. To overcome the above difficulties, the side bracket 40 on the vertical head 22 is provided with a gauge hingedly connected as at 41 so that a movable arm or element of the gauge may at all times be in contact with the periphery or edge of the gear or toothed wheel being rounded off. Consequently, the operator may observe the dial of the gauge and discontinue the cutting or rounding off operation when the proper size has been obtained.

Referring to Figs. 6 to 9 of the drawings, the gauge comprises a top and bottom casing, A, A' through which a horizontal slot or groove B guides a slotted arm C, one end of the slotted arm having an extension C' substantially at right angles thereto and adapted to contact with the periphery or edge of the blank or toothed wheel above referred to. A large toothed wheel or gear D is held under tension by a hair spring E. The gear D meshes with a pinion F which in turn meshes with a second gear G, the axis of which and the screw $g$, guides the slotted arm in the groove. The gear G is provided with a pinion F' which rotates the central, large gear H. A pinion J on the same shaft as the large gear H meshes with the rack teeth H' on the lower edge of the slotted arm C.

On the bottom of the large gear H is a notched disk L provided with a pin which is adapted to enter between sets or pairs of teeth of a toothed wheel M, the slot being just large enough to receive but one pair of such teeth. With each rotation of the notched disk, the toothed wheel will be advanced a distance between each set of the teeth thereon, it being understood that when the notch is free of the teeth, one pair of teeth will be in engagement with the periphery of the said notched disk until one complete revolution is made whereupon the pin enters between the teeth to again carry the notched disk a definite space.

With each revolution of the notched disk L, the toothed wheel N is advanced one tooth, which in turn advanced the toothed wheel P, said last mentioned wheel being in engagement with the ball lever R held by the spring R'. On the post of the large gear H is the main hand $h$ which designates sizes from one to ten. On the pinion post F is the small hand $f$ which designates eighths on the face of the dial. A second dial is also provided, the axis of which is positioned on the post of wheel P to designate the number of times the main hand revolves or the number of units of sizes due to the operation of the freely movable arm of the gauge.

Figure 8:
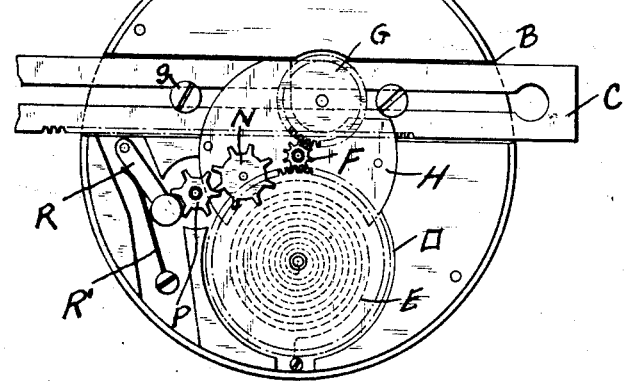
Fig. 8 is an enlarged interior view of the measuring instrument with the dial removed.
Figure 7:
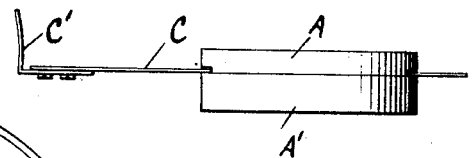
Fig. 7 is a side view of the measuring instrument.
Figure 9:
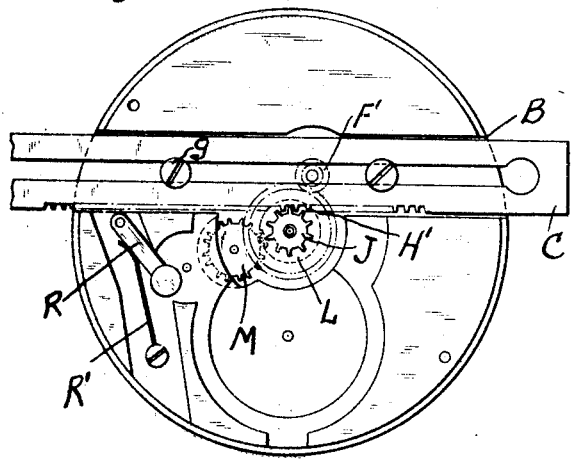
Fig. 9 is an enlarged interior, bottom view of the measuring instrument.

It will of course be understood that when the freely movable arm is in contact with the gear or toothed wheel to be rounded off, the said arm has been moved outwardly or to the left for instance, as shown by Figs. 6 or 8 of the drawing. In so moving, the hair spring has been placed under tension during the revolution of the meshed gears. The main hand has been moved to the initial size of the gear or toothed wheel to be rounded so that as its size decreases, the respective indicator arms on the dial move correspondingly to designate the size of the gear or toothed wheel. By observing the dials and the hands, the operator can determine when the exact size has been reached without stopping or interrupting the rounding off operation. It will of course be understood that the rounding off operation is regular and gradual so that the size of the blank or toothed wheel decreases in size according to the graduations on the face of the dial in units of eighths and in sizes of one.

Having shown and described my invention what I now claim as new and desire to secure by Letters Patent of the United States is:

1. A lathe attachment of the class described comprising a block, a hinged gauge carried by said block, said gauge having a slotted work engaging element slidable therethrough and interior reduction gearing cooperating therewith, a dial and indicating arms actuated by said gearing whereby the diameter of a gear being reduced may be determined at all stages of the continuous cutting operation and means for setting the gear to be cut on said block for contact with the said work engaging element.

2. A lathe attachment of the class described comprising a block, a hinged gauge carried by said block, said gauge having a resiliently controlled work engaging element slidable therethrough and interior reduction gearing cooperating therewith, a dial and indicating arms actuated by said gearing whereby the diameter of a gear being reduced may be determined at all stages of the continuous cutting operation and means for setting the gear to be cut on said block for contact with one end of the work engaging element and in the path of a revolving cutter.

3. A lathe attachment of the class described comprising a block, a hinged gauge carried by said block, said gauge having a resiliently controlled work engaging element slidable therethrough and reduction gearing cooperating therewith, a dial and indicating arms actuated by said gearing whereby the diameter of a gear being reduced may be determined at all stages of the continuous cutting operation, means for setting and clamping a gear to be cut in a horizontal position relatively to the end of the work engaging element and in the path of a revolving cutter and means for adjusting the said block relatively to said cutter.

4. A lathe attachment for watch wheel gears and the like comprising a plate, a block guide and an adjusting block carried by said plate, a horizontal guide block and work head adjustable therein carried by the adjusting block, means for supporting a gear on said work head and a hinged gauge carried by the work head, said gauge having a slotted work engaging element slidable through the body of the gauge and reduction gearing cooperating therewith whereby the diameter of a gear being cut may be determined at all stages of the continuous gear cutting operation.

5. A lathe attachment for watch wheel gears and the like comprising a plate, a block guide and an adjusting block carried by said plate, a horizontal guide block and work head adjustable therein carried by the adjusting block, a vertical element supported by the work head, a hinged gauge connected to said element, said gauge having a slotted work engaging element slidable through the body of the gauge and reduction gearing cooperating therewith whereby the diameter of a gear being cut may be determined at all stages of the continuous gear cutting operation.

6. A lathe attachment for watch wheel gears and the like comprising a plate, a block guide and an adjusting block carried by said plate, a horizontal guide block and work head adjustable therein carried by the adjusting block, a vertical block and adjustable head supported by the work head, a hinged gauge connected to the vertical block, said gauge having a slotted work engaging element slidable through the body of the guage and reduction gearing cooperating therewith whereby the diameter of a gear being cut may be determined at all stages of the continuous gear cutting operation.

In testimony whereof I affix my signature.

SOLOMON HELFGOTT.